United States Patent [19]

Peterson

[11] 3,995,162

[45] Nov. 30, 1976

[54] APPARATUS AND METHOD FOR AUTOMATED X-RAYING OF QUANTITIES OF SMALL ARTICLES

[75] Inventor: Robert Merrill Peterson, Upland, Calif.

[73] Assignee: General Dynamics Corporation, Pomona, Calif.

[22] Filed: Aug. 8, 1975

[21] Appl. No.: 603,057

[52] U.S. Cl. ........................250/453; 250/323; 250/469

[51] Int. Cl.² ....H01J 37/00; G11B 1/00; G03B 41/16

[58] Field of Search..........250/312, 320, 321, 322, 323, 250/358, 359, 360, 439, 444, 445, 446, 453, 469

[56] References Cited

UNITED STATES PATENTS

| | | | |
|---|---|---|---|
| 3,488,496 | 1/1970 | Schneeman | 250/496 |
| 3,488,495 | 1/1970 | Schneeman | 250/453 |
| 3,454,762 | 7/1969 | Vollmer | 250/453 |
| 2,456,816 | 12/1948 | Daly | 250/453 |
| 3,827,070 | 7/1974 | Hoerenz | 250/476 |

*Primary Examiner*—Craig E. Church
*Attorney, Agent, or Firm*—Henry M. Bissell, Edward B. Johnson

[57] ABSTRACT

Apparatus for automated X-raying of quantities of small articles, such as electronic components, comprises a cabinet having formed therewithin a conical X-ray chamber with an elongate, open X-ray window in opposition to an X-ray tube. Articles to be X-rayed, for example, axially leaded resistors, capacitors and diodes, are transversely mounted, in closely-spaced relationship, onto a long, flexible, X-ray transparent strip of material. Dispensing spools are provided outside and adjacent to the cabinet for separately dispensing a rolled strip of strip-mounted articles (article strip) and a corresponding rolled strip of X-ray film. Take-up spools are provided at an opposite side of the cabinet to receive X-ray portions of the article strip and exposed film. Strip feed apertures are formed in sides of the cabinet adjacent to the dispensing and take-up spools, and a guideway is formed within the cabinet adjacent to the X-ray chamber window to guide superimposed portions of article strip and film past the window for X-raying of the articles. Cam-operated switches, responsive to advancement of the article strip and film strip through the guideway, control operation of drive motors connected to the take-up spools so that the strips are caused to be advanced in incremental steps about equal to the length of the X-ray window. Controls are provided for activating the X-ray tube when increments of article strip and film strip are advanced into the X-ray window. Remotely-controlled article strip identifying means are provided in the window area to identify, by means of a punched lead foil tape, each increment of article strip advanced into the window, the X-raying causing identification on the lead foil tape to be transferred to the corresponding increment of film so that subsequent article-to-film correlation may be obtained. A control system is provided for automatically sequencing the strip advancing, the strip identification and the X-ray tube operation, and for providing automatic cycling so that the entire strip of strip-mounted articles may be X-rayed in a sequence of incremental steps, completely automatically and without the need for operator intervention. Recycling bypass means are, however, provided to enable an operator to control proceeding from one functional operation to the next and to control repeating of the functional operations. A corresponding method for automated X-raying of quantities of small articles is thereby provided.

27 Claims, 6 Drawing Figures

APPARATUS AND METHOD FOR AUTOMATED X-RAYING OF QUANTITIES OF SMALL ARTICLES

BACKGROUND OF THE INVENTION

1. Field of the Invention

The present invention relates to the field of automated X-ray apparatus and methods and, more particularly, to the field of such apparatus and methods adapted for X-raying strip-mounted electronic components such as axially leaded resistors, capacitors and diodes.

2. Discussion of the Prior Art:

Electronic components, at least those of which high reliability is required, are commonly X-rayed to detect otherwise hidden defects such as cracks, solder voids or comparatively large particulate contaminants. The often involved high volume of, for example, resistors, however, does not lend itself well to separate X-raying of each part—separate X-raying is far too costly in terms of time and film required. Neither is visual fluoroscoping a practical alternative to film X-raying because the defects which must be determined are generally so minute as to require magnified examination of fine-grain X-ray film; Fluoroscoping does not provide the resolution required. Often, too, it is necessary that a visual record of the defects be available for statistical interpretation of defect modes, or, if X-raying is performed by a customer, a visual record may be required to substantiate rejection and return of defective parts.

It is emphasized that parts with X-ray detectable defects may not exhibit anomalies which can easily be detected by measurement of electrical parameters. In fact, parts rejection by electrical parameter measurement is normally performed first, and only those parts passing such measurements are X-rayed to locate incipient or potential failures.

A need thus exists, particularly in the electronics industry, for efficient X-ray apparatus adaptable for X-raying comparatively large quantities of miniature or micro-miniature components. Certain types of electronic components readily lend themselves to non-individualized, mass X-raying because they need be X-rayed in only a single, non-critical orientation. Typical of such components are axially-leaded resistors, capacitors and diodes, which have few, if any, overlapping internal elements requiring X-raying in more than one orientation to provide the requisite defect discrimination.

Various disclosures have been made of partially-automated apparatus for X-ray or fluoroscopic examination of articles. These include disclosures by Adrian, Kizaur and Vollmer, Jr. (U.S. patents 2,169,483, 2,885,557 and 3,454,762, respectively). Adrian discloses an endless conveyor belt onto which articles are automatically loaded and from which the articles are automatically unloaded. The conveyor belt moves articles thereon past an operator-manned fluoroscoping screen. As previously noted, however, such fluoroscoping provides neither the resolution nor the record required for most electronic component X-ray examination.

Kizaur discloses X-ray examination of articles which are large compared to most electronic components. In particular, solid articles such as rocket projectiles, are examined for voids or large impurities by an X-ray scattering technique. X-ray detectors are used and gross defects only are indicated by an anomalous scattering pattern. No visual indication is provided of the defects.

A number of electronic components are arranged around a periphery of a large wheel in the apparatus disclosed by Vollmer, Jr. The wheel is caused to rotate past an X-ray source, and the X-ray image is transmitted to a remotely-located video screen. Provision is made for rotating individual components for examination in various orientations. Again, however, no visual record of the defects is provided and the resolution of defects by use of the remote video screen is substantially less than that provided by fine-grained X-ray film.

None of the heretofore-known X-ray apparatus meets the requirement for automated, high-resolution X-ray examination of small parts.

Other disclosures relating to automatic or partially automatic advancing the X-ray film in X-ray apparatus include those by Kelley, Takahashi et al., Gidlund, Edlkema, and Willasch et al. (United States Pat. Nos. 1,938,455, 3,090,864, 3,361,046, 3,567,931 and 3,823,322, respectively). However, such disclosures do not provide means for automatically X-raying a series of articles, as is required in the examination of electronic components.

A method commonly heretofore used for X-raying electronic components requiring only single orientation X-raying has been to simultaneously X-ray, on a single sheet of film, a large number of components—perhaps 200 to 300—which have been mounted upon a single large card. However, such a method is comparatively time-consuming, two operators being able to X-ray only about 500 to 700 components per hour.

An improved and automated apparatus for X-raying electronic components, particularly those requiring X-raying in only a single orientation, is highly desirable in order to reduce the unit cost of X-raying and make feasible X-raying of a greater number of parts than can now economically be X-rayed.

SUMMARY OF THE INVENTION

An automated X-raying apparatus, in accordance with the invention, comprises a chamber having an X-ray source-receiving portion, an X-ray window and guideway means past the window. Source means are provided for supplying, in superimposed relationship, an un-X-rayed strip of strip-mounted articles and an unexposed strip of X-ray film to the guideway means and X-ray window, and receiving means are provided for receiving exposed portions of the X-ray film strip and X-rayed portions of the article strip from the guideway means. The receiving means include first and second advancing means for causing advancing of the article and film strips from the source means, through the guideway means and past the X-ray window in first and second incremental manners, respectively. Controlling means are provided for causing X-rays to be emitted through the X-ray window at predetermined intervals, corresponding to the incremental movement of the film and article strips past the X-ray window, and for predetermining X-raying times, to cause X-raying of successive incremental portions of the article strip. Film and article strip identification means are provided to enable correlation between articles on the article strip and article images on the film.

More particularly, the source means includes individual spools adapted for receiving a rolled strip of unexposed X-ray film and a rolled strip of material upon which are removably mounted, in closely-spaced relationship, a quantity of small articles to be X-rayed. The advancing means include separate motor-driven take-up spools for receiving, in rolled form, exposed X-ray film and X-rayed portions of the article strip. The take-up spool motors are separately controlled, by cam-operated microswitches, to stop when preselected incremental lengths of film and article strips have been advanced along the guideway means and into the X-ray window, the cams being responsive to rollers turned by the advancing strips. Separate source and take-up spools and advancing means are provided for the article and film strips to enable different incremental lengths of each to be automatically advanced, greater lengths of film being advanced each step so that those film portions immediately under the X-ray window edges which are subject to some unintended X-ray exposure during one incremental X-raying step are not used during the next incremental X-raying step.

Additional control means are provided to cause automatic operation of a strip identification apparatus which identifies un-X-rayed increments of the article strip, by a punched lead tape, each time article and film strip increments are advanced to the X-ray window by the take-up spool motors. Subsequent emission of X rays through the window is responsive to the incremental advancement of the article and film strips and to operation of the identification apparatus.

The controlling means thus causes automatic, incremental advancing of the article and film strips and subsequent identification and X-raying of the article strip increments. Recycling means are also provided to cause automatic repeating of such X-raying cycles until a predetermined portion of the article strip has been X-rayed. Bypass means are, however, provided to enable an operator to control the strip advancing, identification and X-raying functions and the recycling of such functions.

Means, and a corresponding method, are thereby provided for automated X-raying of a strip upon which a quantity of small articles, such as axially leaded resistors, capacitors and diodes, have been mounted. After the articles have been mounted, for example, as many as about 2,800 resistors per 70-foot strip, and the strip is fed into the apparatus, the articles are automatically X-rayed in incremental, identified groups, as many as about 40 parts being X-rayed in each incremental step. Quick and efficient X-raying of electronic components is thus provided.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENT

Figure 1:
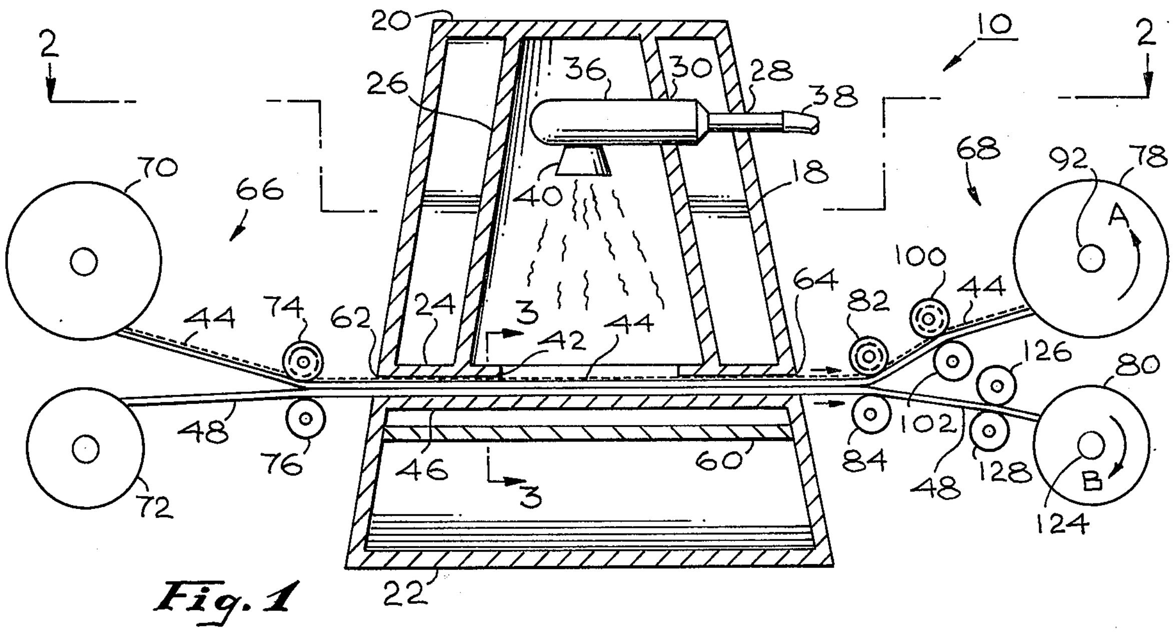
FIG. 1 is a verticle sectional view of automated X-ray apparatus in accordance with the present invention.
Figure 2:
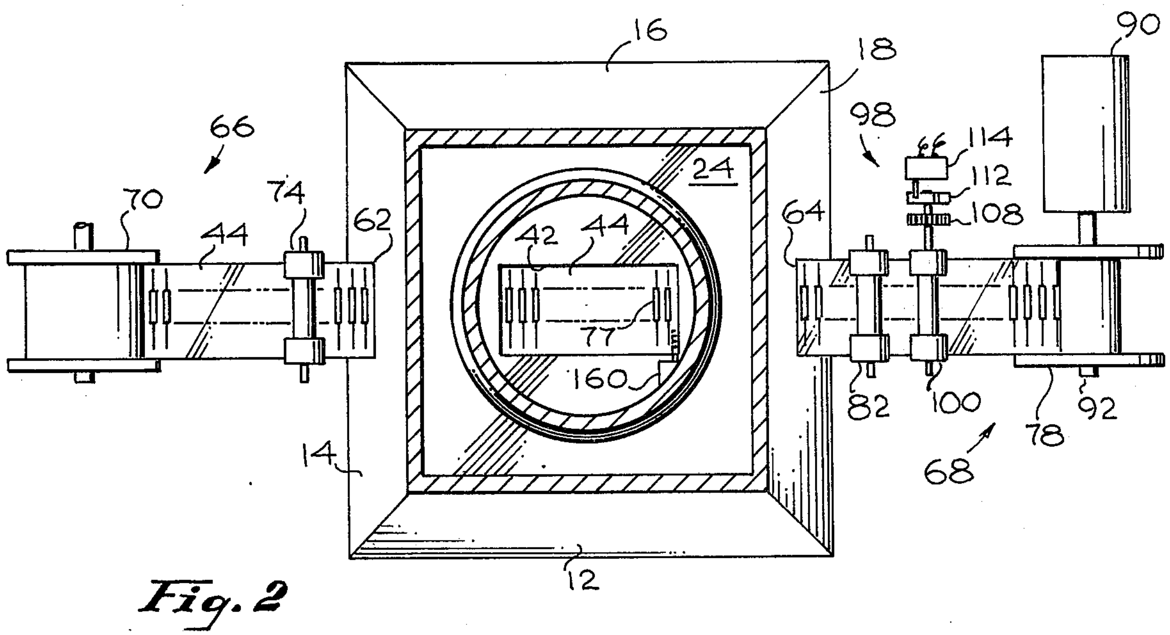
FIG. 2 is a horizontal sectional view along line 2—2 of FIG. 1, showing interior portions of the X-ray apparatus.

Referring to FIGS. 1 and 2, a cabinet or housing 10 of an automated X-ray apparatus for X-raying strip-mounted articles such as axially leaded resistors, includes inclined side walls 12, 14, 16 and 18, a square top 20 and a larger square bottom 42, joined to form a truncated, pyramidal structure. At least a portion of one of the sides 12 or 16 is constructed to be easily removable for access into the cabinet 10. To prevent escape of X-rays from the cabinet 10, the walls, top and bottom 12–22 are formed of lead, preferably about ¼ of an inch thick.

Constructed within the cabinet 10 is a square, horizontal platform 24, which is joined along side edges to insides of the walls 12–18 about ⅓ of the height of the cabinet up from the bottom 22, and parallel to the bottom. The platform 24 is also lead and is preferably about ¼ of an inch thick. Between the inside of the top 20 and the top of the platform 24 is fixed a frustoconical X-ray shield and reflector cone 26, having about a 30° angle of taper. Sides of the cone 26 are spaced several inches inwardly from the chamber sides 12–18, and the cone is positioned generally along the vertical axis of chamber 10. Preferably, the cone 26 is constructed out of ¼ inch thick stainless steel.

Apertures 28 and 30 are formed in upper regions of the side 18 and cone 26 respectively for horizontally receiving an X-ray source or tube 36 and its associated cable 38. An X-ray emitting portion 40 of the tube 36 is positioned along the vertical axis of the cone 26 and is directed downwardly. In axial alignment with the tube portion 40, an elongate X-ray aperture or window 42 is formed in the platform 24 to allow X-raying of articles positioned below the platform. The width of the window 42 (measured between chamber sides 12 and 16) is about the width of an article strip 44 upon which are removably mounted articles to be X-rayed; the window length may be, for example, about 12 inches.

Figure 3:
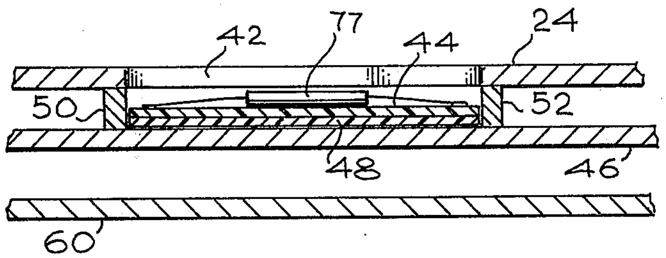
FIG. 3 is a partial sectional view along line 3—3 of FIG. 1, showing the guideway for the article and film strips.

Spaced somewhat below the platform 24 is a second square, horizontal platform 46 which is also attached to the sides 12–18 (FIGS. 1 and 3) and which is adapted for supporting the article 44 strip and a strip of X-ray film 48 positioned thereunder. Spacing between the platforms 24 and 46 is just slightly greater than the combined thicknesses of the strips 44 and 48. To guide side edges of the strips 44 and 48, and attached between the platforms 24 and 46, are stainless steel edge guides 50 and 52.

Positioned somewhat below the platform 46 is a third, square horizontal platform 60, also attached to the sides 12–18. The platforms 46 and 60 are constructed of sheet stainless steel, the former being preferably about ⅛ of an inch thick and the latter being preferably about ¼ of an inch thick, to help prevent X-rays back-scattered from the lower portions of the sides 12–18 and the bottom 22 from reaching the film strip 48.

In alignment with side edges of the window 42, and at the same elevation as the space between the platform 24 and 46, article and film strip slotted feed apertures 62 and 64 are formed respectively in chamber sides 14 and 18. Unexposed X-ray film strip 48 and un-X-rayed article strip 44 are dispensed into the chamber 10, through the aperture 62, from a dispensing means 66. X-rayed article strip 44 and exposed X-ray film strip 48 are received from the chamber 10, through the aperture 64, by a take-up means 68.

The dispensing means 66 comprises an article strip dispensing spool 70 and an X-ray film strip dispensing spool 72, the spools being rotatably mounted (in a manner not shown) in spaced relationship near the outside of the chamber side wall 14 and in general alignment with the aperture 62 (FIGS. 1 and 2). An upper roller 74 and a lower roller 76 positioned to be in rolling contact with the upper surface of the article strip 44 and the lower surface of the film strip 48, respectively, are mounted adjacent to the aperture 62 and in alignment therewith. Since the height of the strips 44 and 48 at the spools 70 and 72, respectively, varies according to the amount of the strips remaining on the spools, the rollers 74 and 76 guide the strips into the chamber 10 through the aperture 62. The upper roller 74 is preferably spool-shaped with a recessed central region which provides clearance between the roller and non-lead portions of articles 77, which are mounted in closely-spaced relationship upon the strip 44 (which is X-ray transparent).

The take-up means 68, positioned outside the chamber wall 18, is similar to the above-described dispensing means 66. It comprises an article strip take-up spool 78, an X-ray film strip take-up spool 80, and upper and lower strip aligning rollers 82 and 84 for guiding the strips 44 and 48 from the aperture 64. The upper roller 82 is spool-shaped (like the upper roller 74) to provide clearance for the articles 77 mounted on the strip 44. Preferably, the spools 70, 72, 78 and 80 include friction elements (not shown) allowing the strips 44 and 48 to be advanced smoothly and comparatively tautly through the chamber 10 and so that the strips 44 and 48 are maintained in close contact in the region of the window 42.

In operation, the strips 44 and 48 are fed from the spools 70 and 72, into the chamber 10 through the aperture 62, along the guideway formed of the platforms 24 and 46 and edge guides 50 and 52, beneath the X-ray window 42, out through the aperture 64 and onto the take-up spools 78 and 80. When preselected portions of the article and film strips 44 and 48 are positioned beneath the window 42, the X-ray tube 36 is actuated to provide an X-ray film record of the articles on the strip 44 above the film. The exposed film (protected against exposure by other than X-rays by being contained in an opaque envelope), is then received upon the spool 80 and may be developed in a conventional manner at the operator's convenience.

Advancing of the article and film strips 44 and 48, as well as operation of the X-ray tube 36 and identification of the article strip at various locations for correlation of articles mounted thereon to the X-ray images (so that discrepant parts may be removed) may be accomplished manually. However, additional benefits in speed of operation may be achieved by automatic or semi-automatic strip advancement, parts strip identification and X-ray tube operation. FIGS. 2, 4, 5, and 6 illustrate a preferred method of such automatic operation.

Figure 4:
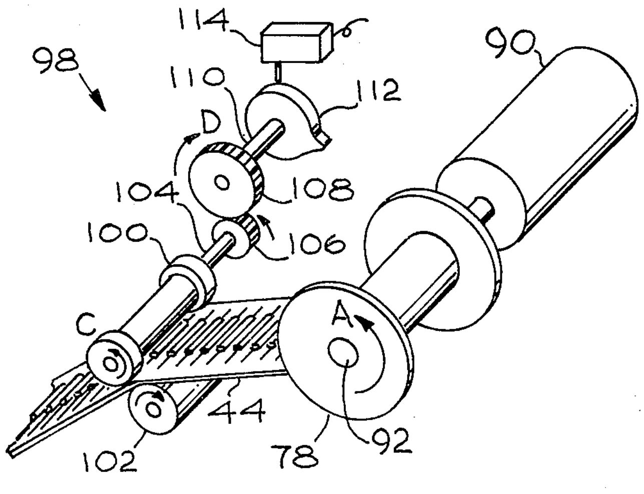
FIG. 4 is a partial perspective view showing portions of the article strip take-up means.
Figure 5:
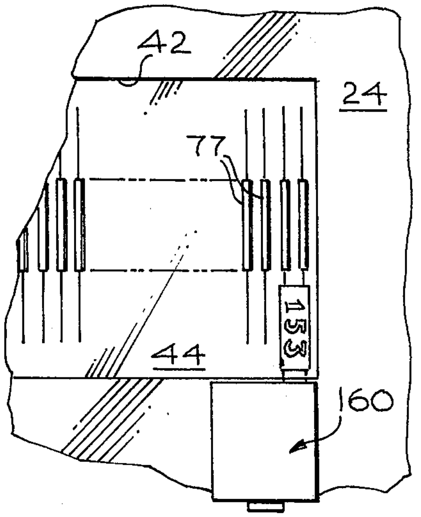
FIG. 5 is an enlarged plan view showing identification of article strip increments.

Referring to FIGS. 2 and 4, an electric drive motor 90 is connected to a drive shaft 92 upon which the article strip take-up spool 78 is fixed. Operation of the motor 90 causes counterclockwise turning of the spool 78 (in direction of arrow A, FIG. 4) and advancing or drawing of the article strip 44 from the dispensing spool 70, through the chamber 10 and onto the take-up spool. Since for X-raying it is desirable to advance the article strip 44 in incremental steps, each step being equal to the length of the window 42, control means 98 (FIG. 4) is provided for stopping the motor 90 when the correct length of article strip has been advanced to the window. A pair of rollers, an upper, spool-shaped roller 100 and a lower roller 102, are spring-biased (in a manner not shown) into rolling contact with upper and lower surfaces, respectively, of the article strip 44. The upper roller 100 is fixed to one end of a shaft 104, to the other end of which is fixed a small gear 106. In driven relationship with the gear 106 is mounted a larger gear 108 fixed to a second shaft 110. Also fixed to the second shaft 110 is a cam 112. Adjacent to the cam 112 is a normally-open microswitch 114 having an actuating plunger or piston 116 in sliding contact with the contoured surface of the cam.

When the motor 90 is operating and causing advancing of the article strip 44 through the chamber 10 and onto the spool 78, the advancing strip causes the rollers 100 and 102 in contact therewith to rotate. The upper roller 100 is caused to rotate in the counterclockwise direction of arrow C (FIG. 4), thereby causing the gear 108 and the cam 112 to rotate in the clockwise direction of arrow D. Each time the cam 112 makes a complete revolution, the switch 114 is momentarily closed by a projecting portion of the cam. Diameters of the upper roller 100 and of the gears 106 and 108 are selected to cause closing of the switch 114 once each time a section of strip 44 equal to the length of the window 42 is advanced between the rollers 100 and 102 by the motor 90.

In an entirely similar manner, a drive motor 122 (FIG. 6) is connected to a drive shaft 124 of the X-ray film take-up spool 80 (FIG. 1). Upper and lower rollers 126 and 128, respectively, are biased into rolling contact with the film strip 48 adjacent to the spool 80, the upper roller driving a cam (not shown), similar to the cam 112, which operates a second, normally-open microswitch 130 (FIG. 6) which controls the motor 122. To provide clear X-ray images of articles on the strip 44 which are adjacent to ends of the window 42, it is desirable that the film strip 48 be advanced in incremental steps which are somewhat greater than the length of the window 42. In this manner, portions of the film strip located under the window edges (where they may receive some radiation exposure) for one X-raying step, will not be used for X-raying articles for the next X-raying step. Diameters of the roller 126 and the associated gears and cam may be varied to provide any desired incremental stepping of the X-ray film strip 48 by the film drive motor 122; however, assuming a 12-inch long window 42, the X-ray film strip 48 is preferably advanced in about 14-inch increments.

Figure 6:
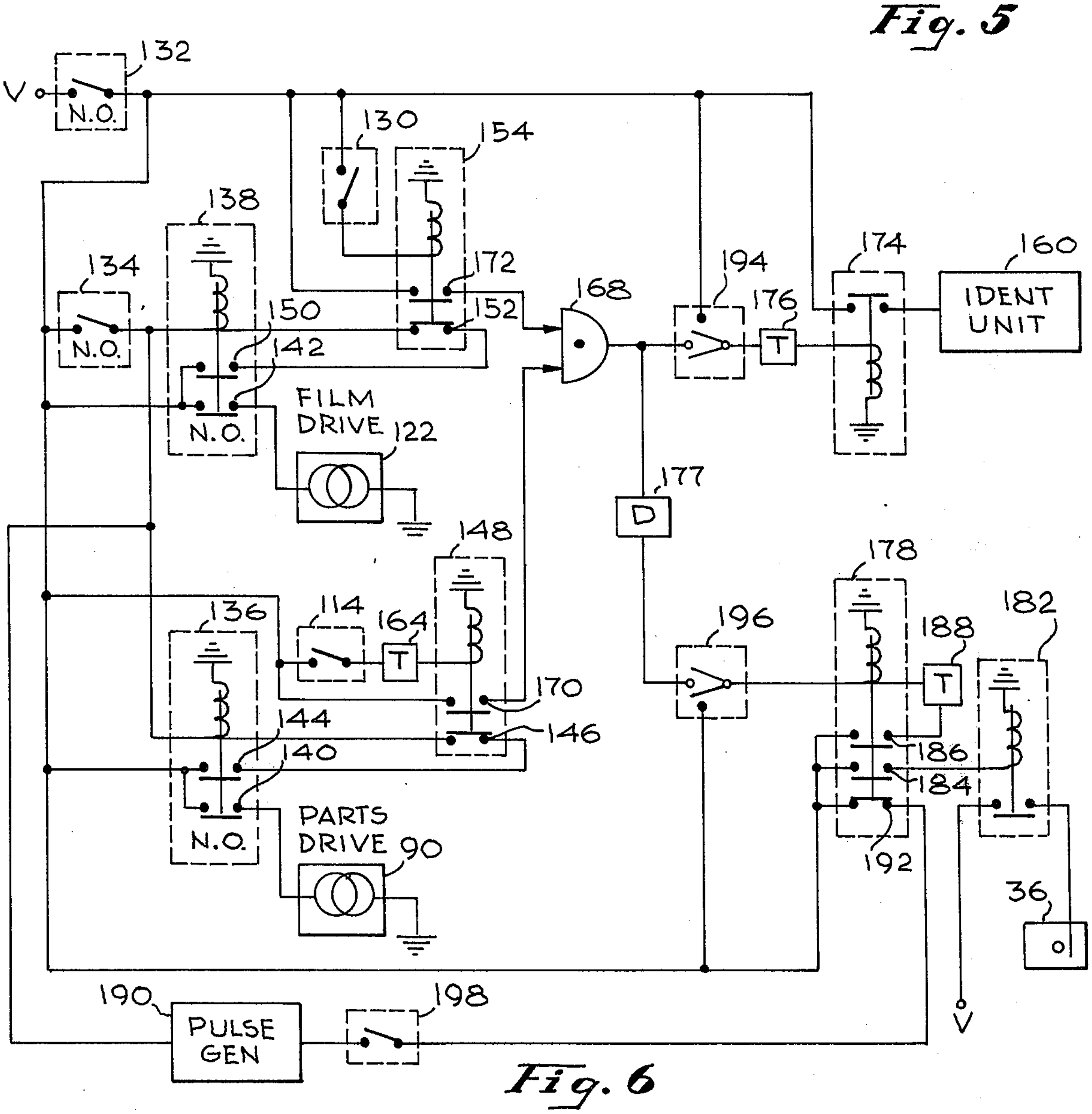
FIG. 6 is an electrical schematic showing the control system for article and film strip advancement, article strip identification and X-ray tube operation.

The cam-operated microswitches 114 and 134 are used to control operation of the parts strip and film drive motors 90 and 122, respectively, in the manner illustrated in the schematic of FIG. 6. A system master switch 132 is closed to provide voltage from a source to a normally-off, momentarily-on switch 134. Momentary actuation of the switch 134 causes energizing of solenoid relays 136 and 138 associated respectively with motors 90 and 122, and causes operation of the motors through normally-open relay contacts 140 and 142, respectively. After release of the switch 132, the relay 136 is latched through normally-open contacts 144 thereof and through normally-closed contacts 146 of a solenoid relay 148, which is later actuated by the microswitch 114. The article strip drive motor 90 continues to operate, advancing the article strip 44 a predetermined incremental step, until the associated cam 112 momentarily closes the microswitch 114. Closing of the switch 114 causes energizing of the relay 148, thereby opening the contacts 146 and unlatching the relay 136, removing voltage from the motor 90.

In an identical manner, the relay 138, associated with the X-ray film strip drive motor 122, is latched through normally-open contacts 150 of such relay and through normally-closed contacts 152 of a solenoid relay 154 associated with the microswitch 130. The motor 132 is operated, advancing the film strip 48 a predetermined incremental step, until the associated cam closes the microswitch 130, thereby energizing the relay 154 which opens the contacts 152 and unlatches the relay 138, removing voltage from such motor.

Each time the momentary-on switch 134 is depressed, the motors 90 and 122 are automatically caused to be operated until the preselected incremental steps of article strip 44 and film strip 48 have been advanced. Note that it is only necessary to keep the switch 134 depressed a sufficient time to advance enough of the strips 44 and 48 to cause the switches 114 and 130 to be reopened, at which time the relays 136 and 138 will latch in.

Further automatic operation is provided by electrically connecting an automatic article strip identifying apparatus 160 (FIGS. 2 and 5) in series with the microswitch-operated relays 148 and 154, as more particularly described below. The identifying apparatus 160, which is mounted in the cabinet 10 adjacent a forward corner of the window 42, comprises solenoid actuated numerical or alpha-numerical tape punch elements (not shown), as well as solenoid actuated, tape advancing, pressing and cutting elements (also not shown). When the apparatus 160 is electrically-actuated, a sequence of several letters and/or numbers (three being shown in a punched tape segment 162 in FIG. 5) is punched into a strip of thin lead foil which is advanced from a roll mounted in the apparatus. The punched segment 162 is then advanced over a corner portion of the increment of article strip 44 in the window 42, and is caused to be pressed onto the strip so that it adheres thereto by a self-adhesive tape-backing. The segment 162 is then caused to be severed from the remaining tape in the apparatus 160. By means of the apparatus 160, each increment of article tape 44, advanced to the window 42, is automatically identified with a numerical or alpha-numerical code, which is caused by a stepping mechanism in the apparatus 160 to be different for each successive increment of the strip. When the article strip increment is X-rayed, the letters or numbers on the tape segment 162 are caused to appear on the segment of film below, so that exact correlation between the film images of the articles and the corresponding articles mounted on the article strip is provided after X-raying is completed. Such exact correlation is necessary in order that, upon examination of the developed X-ray film, articles determined to be discrepant can be identified and removed from the article strip 44.

Automatic operation of the identifying apparatus 160 is provided by the relays 148 and 154 actuated by the microswitches 114 and 130, respectively, as above-described. To provide such operation, a conventional timing circuit 164 causes the relay 148 (closed by the associated microswitch 114) to remain latched for a period of time sufficient to coincide with the closing of the relay 154 (by the microswitch 130) which is associated with the X-ray film drive motor 122. (It should be recalled that the motor 122 is required to operate longer than the motor 90 in order to advance an incremental length of film strip 48 which is greater than the incremental length of article strip 44.) Voltage is applied to one input of an AND gate 168 through normally-open contacts 170 of the relay 148 when that relay is closed by the microswitch 148.

Similarly, voltage is applied to a second input of the gate 168, through normally-open contacts 172 of the relay 154 when that relay is closed by the microswitch 130. When voltages are simultaneously applied to both such inputs of the gate 168—that is, when the drive motors 90 and 122 have both advanced preselected increments of article and film strips and have been stopped—the gate is actuated and an output voltage is momentarily applied to a solenoid relay 174 which energizes the identifying apparatus 160. A conventional timing element 176 causes the relay 174 to be latched, after cessation of the signal from the gate 168, a sufficient length of time to complete actuation of the apparatus 160. In the above-described manner, parts identification is automatically provided, in proper time sequence, each time incremental steps of the strips 44 and 48 have been advanced into the window 42.

Automatic, sequential operation of the X-ray tube 36 may also be provided as shown in the schematic of FIG. 6. Operation of the gate 168, in addition to causing actuation of the identification apparatus 160, also causes operation of the X-ray tube 36. A conventional delay circuit 177 delays operation of an X-ray control solenoid relay 178, in response to the output signal from the gate 168, until operation of the identification apparatus 160 has been completed and the punched tape segment 162 has been applied to the portion of the article strip 44 in the window 42. Actuation of the relay 178 then causes actuation of a high voltage, X-ray tube solenoid relay 182 (through normally-open contacts 184 of the relay 178) and emission of X-rays through the window 42. The relay 178 is latched through normally-open contacts 186 thereof for a predetermined length of time, set by a timer 188, equal to the required X-ray exposure time. When such exposure time has elapsed, the relay 178 is unlatched, thereby opening the contacts 184 which opens the relay 182 and turns off the X-ray tube 36.

Still further circuitry may be provided to automatically proceed to a next advancing, identifying an X-raying cycle. For example, when the relay 178 closes, shutting off the X-ray tube 36 and thereby completing one X-raying cycle or sequence, a pulse generator 190 may be actuated by normally-closed contacts 192 of the relay 178. A recycling pulse is provided by the pulse generator 190 to the relays 136 and 138 controlling the motors 90 and 122 in the same manner that a pulse was initially provided by momentarily closing the switch 134. Repetitive recycling in this manner continues automatically until the master switch 132 is turned off or until the entire strip of articles is X-rayed, at which time a switch (not shown) may automatically cut off the pulse generator 190.

Control system flexibility is, however, provided by including a first on-off-momentary-on switch 194 between the gate 168 and the timing circuit 176 and a second, similar switch 196 between the delay circuit 177 and the X-ray control relay 178. An on-off switch 198 is included between the X-ray control relay contacts 192 and the pulse generator 190. With the three switches 194, 196 and 198 in the "on" condition, fully automatic operation, as above-described, is provided. With the switches 194, 196 and 198 in the "off" condition, operation of the drive motors 90 and 122 is provided by closing the momentary-on switch 134; operation of the identifying apparatus 160 is provided by closing the momentary-on contact of the switch 194 and operation of the X-ray tube 36 is provided by closing the momentary-on contact of the switch 196. It is emphasized, however, that operation of each separate function of the system—advancing of the article and film strips 44 and 48, parts identification, and X-raying—is still performed automatically according to the described circuitry when the appropriate ones of the switches 134, 194 and 196 are actuated; however, there is no automatic progression from one function to the next.

If such semi-automatic operation is desirable, for example, to maintain alertness of an operator, signal lights may easily be provided to inform the operator when to manually progress from one function to the next. Such signal lights may be operated by the gate 168 and delay circuit 177.

By way of example, and not of limitation, the chamber 10 may be about 72 inches high, 48 inches square at the bottom 22 and 36 inches square at the top 20. The total length of the X-ray film strip 48 may be about 75 feet, the film strip being about 70 millimeters wide. The total length of the article strip 44 may be about 70 feet and the strip may also be about 70 millimeters wide. Assuming small, axially-leaded resistors, capacitors and diodes, about 40 parts may be mounted upon the strip 44 per linear foot thereof, providing a total of about 2,800 resistors for the entire strip. The X-ray tube may be a 50 kv to 150 kv conventional X-ray tube. A typical X-ray exposure time for small electronic components may be about 30 to 45 seconds. Assuming a complete cycling time of less than about 2 minutes per cycle, on the order of 1,200 to 1,500 parts or more may be X-rayed per hour in the manner described.

It is to be appreciated that the above has been given by way of illustration and example only. Other methods of automatic operation may be provided than that illustrated and described. For example, electronic circuitry may be used in place of the relays shown in the control system. In addition, rather than employing a continuously open window 42 and turning the X-ray tube 36 on and off to effect X-raying of the articles, the window 42 may be provided with a movable lead shutter by means of which exposure through the window, from a continuously turned on X-ray tube, may be controlled. Such shutter may be manually or automatically moved.

Corresponding methods for X-raying strip-mounted articles are provided in accordance with the above description.

Thus, although there have been described hereinabove specific arrangements of an automated parts X-raying apparatus, in accordance with the invention, for the purpose of illustrating a manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An automated X-ray apparatus, which comprises:

a. an X-ray chamber having a portion thereof adapted for receiving an X-ray source,
   said chamber being formed to minimize escape of X-rays therefrom, and including guideway means adjacent to said portion for guiding an elongated strip of X-ray film and a superimposed elongated strip of strip-mounted articles to be X-rayed past an X-ray window into said portion;

b. X-ray film source means adapted for supplying an unexposed strip of X-ray film to said guideway means and to said window;

c. article source means adapted for supplying a strip of strip-mounted articles to be X-rayed to said guideway means and to said window;

d. receiving means adapted for receiving exposed portions of a strip of X-ray film and X-rayed portions of a strip of strip-mounted articles from said window and said guideway means;
   said receiving means including first advancing means adapted for causing a strip of X-ray film to advance from said film source means along said guideway means and past said window a first predetermined, incremental distance, and including an independent second advancing means adapted for causing a continuous strip of strip-mounted articles to advance from said article source means along said guideway means and past said window a second predetermined, independent distance, whereby a strip of strip-mounted articles may be X-rayed in incremental steps; and e. controlling means adapted for causing X-rays to be emitted through said window at predetermined intervals, corresponding to incremental movement of X-ray film and article strips past the X-ray window, for predetermined times whereby to cause X-raying of successive incremental portions of an article strip advanced past said window.

2. The invention as claimed in claim 1, including article strip and X-ray strip identification means for enabling correlation between individual strip-mounted, X-rayed articles and article images on an exposed and developed strip of X-ray film, whereby an individual article may be associated with an X-ray image of said individual article.

3. The invention as claimed in claim 1, wherein said controlling means includes means for turning on and off an X-ray source received in said chamber portion.

4. The invention as claimed in claim 1, wherein said controlling means includes shutter means cooperating with said window, and means for positioning said shutter means in a first condition allowing X-rays to pass through said window and in a second condition preventing X-rays from passing through said window.

5. The invention as claimed in claim 1, wherein said first advancing means is adapted for advancing in each incremental step a section of X-ray film strip having a length greater than the length of each section of strip-mounted article strip advanced in incremental steps by said second advancing means.

6. The invention as claimed in claim 5, wherein said first advancing means is adapted for causing advancing of a strip of X-ray film at the rate of about 14 inches each incremental step and said second advancing means is adapted for causing advancing of a strip of strip-mounted articles at the rate of about 12 inches each incremental step, and wherein said X-ray window is about 12 inches long.

7. The invention as claimed in claim 1, wherein said guideway means include an upper strip of lead, and a lower strip of stainless steel whereby to minimize X-ray scattering.

8. The invention as claimed in claim 1, wherein said chamber portion is defined by a generally conical wall of stainless steel, whereby to minimize X-ray scattering.

9. The invention as claimed in claim 1, wherein said film source means includes a first spool means adapted for receiving a roll of X-ray film and wherein said article source includes a second spool means adapted for receiving a roll of strip-mounted articles.

10. The invention as claimed in claim 1, wherein said first advancing means includes a first motor driving a first take-up spool adapted for receiving thereupon a strip of exposed X-ray film and said second advancing means includes a second motor driving a second take-up spool adapted for receiving thereupon a strip of X-rayed strip-mounted articles.

11. The invention as claimed in claim 10, wherein said first advancing means includes means for causing said first motor to stop when a predetermined length of an exposed X-ray film strip has been received upon said first take-up spool and said second advancing means includes means for causing said second motor to stop when a predetermined length of an X-rayed article-mounted strip is received upon said second take-up spool.

12. The invention as claimed in claim 11, wherein said controlling means is response to said first and second advancing means, whereby X-rays are caused to be emitted through said window within a predetermined time after said first and second motors are stopped.

13. An automated X-ray apparatus, which comprises:

a. a housing having disposed therewithin an X-ray chamber,
   said chamber having in a portion thereof an X-ray window,
   said housing including guideway means adapted for guiding superimposed strips of strip-mounted articles and X-ray film past said window;
b. an X-ray source disposed in said chamber;
c. source means adapted for supplying separately a strip of un-X-rayed strip-mounted articles and a strip of unexposed X-ray film to said guideway means,
   said source means including a first dispensing spool adapted for mounting a rolled strip of strip-mounted articles and a second dispensing spool adapted for mounting a rolled strip of X-ray film;
d. receiving means adapted for receiving separately a strip of X-rayed strip-mounted articles and a strip of exposed X-ray film from said guideway means, said receiving means including a first take-up spool adapted for receiving in roll form a strip of X-rayed strip-mounted articles and a second take-up spool adapted for receiving in roll form a strip of exposed X-ray film; and
e. system operating and controlling means including independent article strip advancing means for incrementally advancing a strip of strip mounted articles and X-ray film advancing means adapted for independently causing incremental advancement of a strip of X-ray film along said guideway means, from said source means to said receiving means, in a predetermined manner, and X-ray control means for causing emission of X-rays through said window at predetermined intervals and for predetermined lengths of time.

14. The invention as claimed in claim 13, including identifying means adapted for identifying increments of a strip-mounted article strip advanced by said advancing means to said window, said identifying means including means adapted for correspondingly identifying an associated increment of X-ray film strip also advanced by said advancing means to said window.

15. The invention as claimed in claim 14, wherein said identifying means is disposed adjacent to said window and wherein said system operating and controlling means includes identifying control means for controlling operation of said identifying means.

16. The invention as claimed in claim 15, wherein said X-ray control means and said identifying control means are responsive to said advancing means, to first cause identification of each increment of strip-mounted article strip moved to said window and to next cause emission of X-rays through said window after said advancing means has advanced an increment of strip-mounted article strip and an increment of X-ray film strip to said window.

17. The invention as claimed in claim 16, wherein said system operating and controlling means includes recycling means for automatically causing said advancing means to advance a next increment of strip-mounted article strip and a next increment of X-ray film strip to said window when said X-ray control means stops emission of X-rays through said window and a prior increment of strip-mounted article strip has been X-rayed.

18. The invention as claimed in claim 13, wherein said X-ray control means includes shutter means associated with said window and means for moving said shutter means between a first position allowing X-rays to be emitted through said window and a second position not allowing X-rays to be emitted through said window.

19. The invention as claimed in claim 13, wherein said advancing means includes a first motor connected to said first take-up spool and a second motor connected to said second take-up spool, and shut-off means for separately turning off said first and second motors when a preselected increment of strip-mounted article strip and an independently preselected increment of X-ray film strip have been advanced along said guideway.

20. The invention as claimed in claim 19, wherein said shut-off means includes an electrical switch and a roller mounted cam associated with said first motor, said switch being operated by said cam to turn off said first motor in response to turning of said first cam by movement of said preselected increment of strip-mounted articles strip therepast.

21. The invention as claimed in claim 20, wherein said shut-off means includes a second electrical switch and a second roller mounted cam associated with said second motor, said second switch being operated by said second cam to turn off said second motor in response to turning said second cam by movement of said preselected increment of X-ray film strip therepast.

22. The invention as claimed in claim 13, including friction means for maintaining a predetermined tension in portions of a strip-mounted article strip and in portions of an X-ray film strip positioned in said window.

23. The invention as claimed in claim 13, including guide means for guiding a strip of strip-mounted articles and a strip of X-ray film into and from said guideway means and through apertures formed in said housing.

24. The invention as claimed in claim 13, wherein said X-ray chamber is formed with walls arranged in frusto-conical shape and wherein the walls thereof are constructed of stainless steel.

25. A method for automated X-raying of small articles, which comprises the steps of:

a. mounting a sequence of said small articles onto a continuous strip of flexible, X-ray transparent material;
b. forming X-ray film into a long strip having substantially the same width as said article mounting strip;
c. forming an X-ray chamber having an X-ray window;
d. automatically advancing an increment(s) of said article-mounting strip and separately advancing an increment of said X-ray film into superimposed relationship across said window;
e. stopping said advancing when an un-X-rayed increment of article-mounting strip and an unexposed increment of X-ray film strip are superimposed across said window;
f. causing emission of X-rays through said window for a length of time sufficient to obtain an X-ray irradiation of articles on said increment of article-mounting strip; and
g. automatically re-advancing said article-mounted strip separately from but along with said X-ray film and automatically restopping said advancing when a next un-X-rayed increment of article-mounting strip and next unexposed increment of X-ray film strip are across said window in a sequential manner until a desired portion of article-mounted strip has been X-rayed, the automatic re-advancing occurring after a previous initiation of advancing of an increment of said article-mounted strip and of an increment of said X-ray film across the window.

26. The method as claimed in claim 25, wherein the steps of advancing increments of said article mounting strip and said X-ray film, the step of stopping said advancing, the step of identifying said un-X-rayed increment of article-mounting strip, and the step of causing emission of X-rays through said window, are caused to be performed sequentially and automatically after said advancing has been initiated.

27. The method as claimed in claim 25, including the step of identifying said un-X-rayed increments of article-mounting strip positioned across said window in such manner that the associated increment of X-ray film is correspondingly identified after X-raying.

* * * * *